United States Patent [19]
Carey

[11] 3,857,794
[45] Dec. 31, 1974

[54] OXYGEN CONTROL BY INJECTION OF A REDUCING GAS IN A CATALYST REGENERATOR

[75] Inventor: Edward J. Carey, El Paso, Tex.

[73] Assignee: Chevron Research Company, San Francisco, Calif.

[22] Filed: Sept. 22, 1971

[21] Appl. No.: 182,828

Related U.S. Application Data

[63] Continuation of Ser. No. 803,276, Feb. 28, 1969, abandoned.

[52] U.S. Cl............... 252/419, 23/288 B, 23/288 S, 208/113, 208/159, 208/164, 252/417
[51] Int. Cl............................................. B01j 11/04
[58] Field of Search........... 252/417, 419; 23/288 S; 208/159, 160, 164

[56] References Cited
UNITED STATES PATENTS

| | | | |
|---|---|---|---|
| 2,391,327 | 12/1945 | Mekler | 252/419 |
| 2,393,839 | 1/1946 | Thomas et al. | 252/417 |
| 2,414,883 | 1/1947 | Martin | 252/417 |
| 2,436,041 | 2/1948 | Gerhold et al. | 252/417 |
| 2,454,373 | 11/1948 | Blanding | 252/417 |
| 2,458,862 | 1/1949 | Krebs | 208/159 |

*Primary Examiner*—Daniel E. Wyman
*Assistant Examiner*—P. E. Konopka
*Attorney, Agent, or Firm*—G. F. Magdeburger; R. H. Davies; J. D. Foster

[57] ABSTRACT

In a process for reducing the amount of oxygen in the effluent gases from a catalytic cracker regenerator, and thus controlling after-burning, a reducing gas such as carbon monoxide or hydrogen is injected into the regenerator above the bed of catalyst being regenerated. Preferably the amount of reducing gas is automatically controlled responsive to the oxygen content of the effluent flue gases from the regenerator. Preferably the reducing gas is introduced through at least three nozzles into the regenerator. Preferably the nozzles are located in substantially different positions within the regenerator above the bed of catalyst being regenerated, and the amount of reducing gas flow through each nozzle is controlled responsive to oxygen content of the effluent flue gases from the regenerator.

4 Claims, 1 Drawing Figure

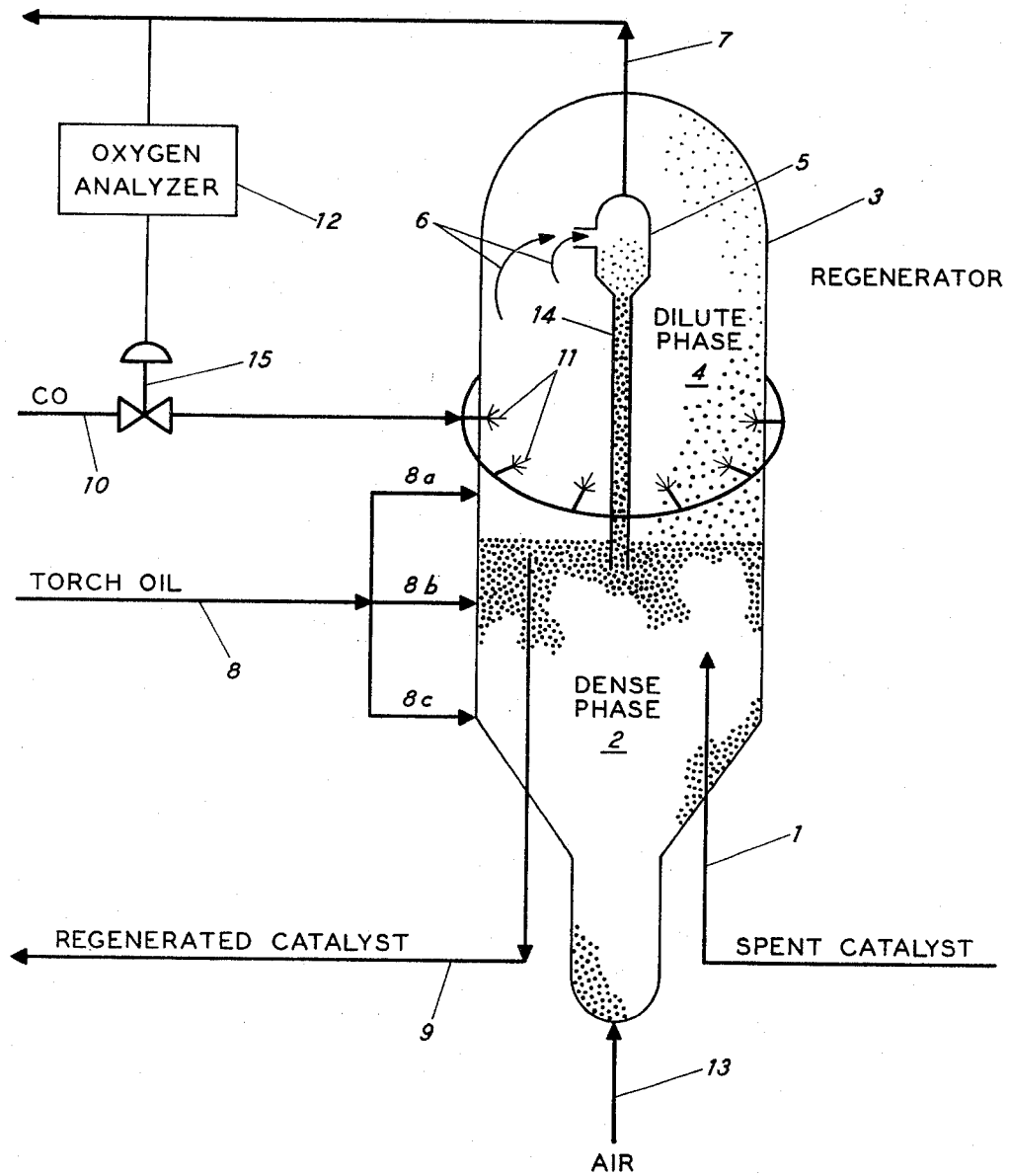

OXYGEN CONTROL BY INJECTION OF A REDUCING GAS IN A CATALYST REGENERATOR

This is a continuation of application Ser. No. 803,276, filed Feb. 28, 1969, now abandoned.

BACKGROUND OF THE INVENTION

1. Field of the Invention

This invention relates to the regeneration of solid particles by burning with air or other oxygen-containing gas, and more particularly, relates to the regeneration of spent or fouled catalyst particles in hydrocarbon conversion operations.

2. Description of the Prior Art

The invention is more specifically directed to improvements in the type of operation wherein the mass of solid particles from which combustible contaminants are being burned is maintained in the form of a fluid-like bed of relatively high density of solid particle concentration. In operations of this general type, it is advantageous to maintain a light-phase region of materially reduced solid particle concentration above the fluid-like bed in the confined zone or vessel in which burning is accomplished. By so doing, a major separation of solid particles from the gaseous products of combustion leaving the fluid-like bed is effected within the latter at substantially its upper extremity and within the lower portion of the light phase above the bed, so that only a small amount of entrained solid particles remain to be separated from the outgoing gas stream, thus reducing the load on the solid particle separating equipment employed.

The phenomenon called "after-burning" has been known in the petroleum industry for many years. This feature of fluidized catalytic operation is characterized by the appearance of elevated temperatures in the dilute or lean solids phase which superposes the dense phase in a conventional fluidized bed operation. Controlled after-burning in the dilute phase is desirable and necessary if adequate oxygen is available in dense phase below. After-burning occurs when oxygen, used for example in the regeneration of catalytic solids contaminated with carbonaceous material, passes through the dense catalyst bed unconsumed and enters the dilute catalyst phase. This oxygen combines with the carbon monoxide (a product of combustion from the dense phase) to produce carbon dioxide. If the oxygen is not consumed in the lean phase where adequate solids traffic is available to remove the heat, runaway after-burning (uncontrolled) may occur in downstream equipment such as cyclones, plenum and flue gas line. By controlled after-burning in the dilute phase is meant a temperature rise in the lean phase relative to the dense phase of 20°- 100° F. Uncontrolled after-burning due to unconsumed oxygen leaving the dilute phase can produce temperatures elevated several hundred degrees above the temperature in the dilute or dense phase bed. These high temperatures in many instances have disastrous effects on the catalyst recovery system, for example, catalyst cyclones, or on the upper portion of the regeneration vessel itself.

The primary purposes of the present invention are: to allow higher temperatures and oxygen concentration in the dense phase of a catalytic cracker regenerator so that the carbon content may be reduced to a lower than normal level, to prevent or reduce the occurrence of after-burning in or downstream of the cyclones, plenum, anf flue gas line, while simultaneously maintaining substantial smooth catalyst flow and circulation and thus avoiding upsets in the catalytic cracking system.

Various methods have been suggested for controlling after-burning in regenerators. For example, in U.S. Pat. No. 2,454,373 a method is disclosed for maintaining the oxygen concentration of the regeneration gases leaving the dense bed below about 1.6 percent by injecting fouled catalyst or by spraying oil into the dilute phase of the regenerator.

Also, "snort air" systems have been proposed wherein a controlled portion of the oxygen containing stream fed to the regenerator is vented off ahead of the regenerator in order to maintain low oxygen content in the dilute phase. This scheme is undesirable because it also results in an oxygen deficient dense phase zone. In addition, this system often results in undesirable shifts in catalyst inventory from or to the regenerator and to or from the reactor, particularly in Model IV FCC units.

Still another method used to control after-burning in the upper portions of the regenerator is to spray water into the regenerator to lower the temperature. However, this also is unsatisfactory because the water damages catalyst being disengaged from the upwardly rising gases and also causes thermal shock to the cyclones, etc.

SUMMARY OF THE INVENTION

According to the present invention, a process is provided for allowing enriched oxygen content and high temperatures to exist in the dense phase in the regenerator but yet preventing or reducing uncontrollable after-burning in the upper parts (as for example in the cyclones) of the regenerator According to the present invention, a process is provided for reducing the amount of oxygen, in the effluent gases from a catalytic cracker regenerator, which process comprises injecting a reducing gas into the regenerator above the bed of catalyst being regenerated. Thus the present invention is basically a process of establishing controlled after-burning. It permits an enriched oxygen concentration in the primary burning zone and removes the excess oxygen in a dilute phase zone where adequate heat removal capacity exists. Downstream equipment is thus protected from uncontrollable after-burning.

Reducing gas is used herein in the sense of the opposite of an oxidant; that is, a reducing gas is a gas which is oxidizable, preferably readily oxidizable.

Preferably the amount of reducing gas is controlled responsive to the oxygen content of the effluent flue gases from the regenerator. It is difficult to obtain meaningful analyses of oxygen content in the lower part of the light phase in the regenerator and for this reason it generally is not preferable to control the amount of reducing gas introduced to the light phase in response to the oxygen content immediately above the dense phase. However, in many instances it may be suitable to control the flow of reducing gas to the light phase in response to the temperatures of oxygen content in the upper part of the light phase or in one of the cyclones or other equipment in the upper part of the regenerator.

Preferably, the reducing gas is carbon monoxide. With larger amounts of carbon monoxide present, there is a mass action effect to speed up the reaction CO plus $O_2$ reacting to form $CO_2$. Thus, with the greater amounts of carbon monoxide present the oxygen content can be reduced to quite low levels as, for example, below about 1.5 volume percent and usually as low as 0.3 to 0.5 percent by volume. When the operating conditions are optimized, the oxygen content may be reduced as low as 0.05 to 0.1 percent in the gases entering the regenerator cyclones.

In the present invention it is desired to maintain an oxygen concentration of at least 0.5 volume percent in the gas leaving the dense bed of the regenerator. The bulk of the carbon burning occurs in the dense bed, and carbon burning rate is favored by higher oxygen concentration. One of the advantages of the present invention is that excess oxygen from the dense phase is consumed in the dilute phase, before the cyclones, by means of a proper balance of a combustible gas introduced into the dilute phase.

Because considerable catalyst is present in the dilute phase, the heat generated by the combustion of admixed gas will be more readily dissipated than when burning occurs in the cyclones.

After-burning in the cyclones or downstream equipment will be substantially eliminated because little oxygen is present beyond the dilute phase when the process of the present invention is used.

In the present invention, since excess oxygen is consumed by burning with a reducing gas added to the dilute phase, upsets in dense phase inventory that would result if air rate is trimmed to control excess oxygen leaving the dense phase bed are avoided.

Other reducing gases which may be used instead of, or together with carbon monoxide, include hydrogen and methane. In some instances it is particularly preferable to use hydrogen gas, as for example when a hydrogen-rich off-gas is ready available from a catalytic reforming unit.

The distribution of combustible material in the light phase is generally found not to be uniform. Therefore, preferably the reducing gas is introduced through at least three nozzles into or within the regenerator, said nozzles being located in substantially different positions within the regenerator. Preferably the amount of reducing gas flow in each nozzle is controlled responsive to oxygen content of the effluent flue gases from the regenerator or from individual cyclone temperatures or both. Although it is preferable to have the control completely automatic, this requires more instrumentation than if the control to the respective nozzles is adjusted manually so as to control the reducing gas flow through the respective nozzles. When the flow through the nozzles is equalized or is set in a preferred flow pattern by adjustment of the respective nozzles, it is advantageous to automatically control the total flow of reducing gas into the nozzle system in response to the oxygen content of the effluent flue gases or the oxygen content existing in the upper part of the regenerator.

There are a number of nozzle configurations which may be employed. It is advantageous to have a multiple number of nozzles for reducing gas injection around the periphery of the regenerator immediately above the dense phase or to have a spider network of nozzles similar to a sparger system inside the regenerator immediately above the dense phase. Because the gases assume varying flow patterns, which in many instances cause unequal distribution of the materials and reactants in the light phase, it is advantageous to have the reducing gas injected at various points in the light phase.

Generally, it is preferred to inject the reducing gas within the first 20 feet of the length of the regenerator immediately above the top of the dense phase. Preferably, the reducing gas is injected 0 to 7 feet above the top of the dense phase. The heat transfer is much better immediately above the dense phase because there is a substantial amount of catalyst particles present in the gases immediately above the dense phase. These catalyst particles serve as a heat sink and also help to disperse the heat more uniformly so as to avoid local hot spots. The density of the gases present in the light phase for a typical fluid catalytic cracker at the entry to the cyclones is about 0.5 to 1 pound per cubic foot, whereas the overall density of the light phase immediately above the dense phase is about 4 pounds per cubic foot due to the catalyst particles present in the gases. Any possible explosion hazard is believed to be reduced by injecting gas immediately above the dense phase because the heat from the reaction of the reducing gas with the oxygen is more readily dispersed.

BRIEF DESCRIPTION OF THE DRAWING

The drawing is a schematic illustration of a preferred embodiment of the present invention as used, for example, in a catalyst regenerator for a fluid catalytic cracking process.

DETAILED DESCRIPTION

Referring in more detail to the drawing, spent catalyst is introduced to the regenerator via line 1. The catalyst is introduced into dense phase 2 in the lower part of the regenerator. Air is blown into the dense phase via line 13 to provide oxygen necessary to burn carbon off the catalyst so that the catalyst will be reactivated, i.e., regenerated. The air also enables the fine catalyst particles to exist in dense phase 2 in a fluidized state which is relatively closely packed and much like a liquid. In the regeneration of fluid catalytic cracking catalysts, temperature existing in dense phase 2 are generally between about 1,000° and 1,200° F. In the process of the present invention, higher temperature may be obtained. These higher temperatures, for example, in the order of 1,175° to 1,250° F, enable the carbon content of incoming spent catalyst to be burned down from the normal levels of about 1 to 1.5 weight percent to about 0.3 to 0.5 weight percent and in some instances as low as 0.2 weight percent. Because of the low carbon content of the regenerated catalyst as obtained in accordance with the present invention, substantially higher conversions may be obtained in the reactor in the catalytic cracking process. Thus, a greater yield of high value product oil and gasoline is obtained from the catalytic process in accordance with the present invention.

The regenerated catalyst is removed from the bottom of the dense phase via line 9 and is passed to a catalytic reactor. The top of the dense phase is indicated schematically by line 3. Existing above the dense phase is dilute phase 4. In dilute phase 4 a fine mixture of catalyst particles exists due to the large quantities of gases flowing upwards in the dilute phase. The gases are comprised largely of $N_2$, $CO_2$ and CO as well as small quantities of $O_2$. These gases enter, as indicated by arrow 6, into cyclone 5. Generally there are a large number of cyclones used in the typical regenerator. The gases swirl around in cyclone 5 and catalyst particles drop down and back to dense phase 2 via standpipe 14. The cleaned gases exit via line 7. In many instances the gases are passed through an effluent flue gas cooler and are used to generate steam. In other instances the gas may be combusted, that is, the CO combusted in order to provide additional heat to generate steam which may be used in the refinery or chemical plant.

Torch oil is injected via line 8 to the dense phase as an added control to obtain burning so as to control or help prevent after-burning in the upper part of the regenerator. The torch oil also serves to help maintain a heat balance. Torch oil is normally injected directly into the dense phase via lines 8b and 8c. It may also be injected via line 8a above the dense phase. In the present process the torch oil may be used in conjunction with reducing gas, although an advantage of the present invention is the substantial elimination of the need to rely on the use of a heavy oil such as torch oil.

In accordance with the present invention, carbon monoxide is introduced via line 10. The flow of carbon monoxide is controlled by valve 15 which in turn is controlled automatically by oxygen analyzer 12 in response to the oxygen content of the effluent flue gas in line 7. It also may be controlled by temperatures located in selected cyclones. The CO in turn is injected into the dilute phase of the catalyst in the regenerator as is shown by nozzles 11. The existence of the CO serves to scavenge out remaining oxygen present in the dilute phase so that there is insufficient oxygen to support detrimental and dangerous after-burning downstream of the regenerator as, for example, in or after cyclone 5. For example, for one fluid catalytic cracking process, it has been estimated that 0.5 percent oxygen is sufficient to support CO combustion causing the flue gas to raise 50° F. A raise in temperature of 50° F may be very detrimental to cyclone 5. Also, if it is necessary to inject water into the dilute phase in order to control the temperature, damage is often done to the equipment due to the extreme difference in temperatures, and often the catalyst is somewhat damaged.

Although various specific embodiments of the invention have been described and discussed, it is to be understood that they are meant to be illustrative only and not limiting. Certain features of the process may be changed without departing from the spirit or essence of the invention. It is apparent that the invention has broad application to the regeneration of catalyst for various catalytic processes. Accordingly, the invention is not to be construed as limited to the specific embodiments illustrated but only as defined in the following claims.

I claim:

1. A cracking catalyst regeneration process for allowing enriched oxygen content and high temperatures of at least about 1,175° F. to exist in a dense phase bed of catalyst particles in a fluidized bed, dense phase-dilute phase catalytic cracker regenerator, and for reducing uncontrolled after-burning in the regenerator, which comprises injecting a reducing gas selected from the group consisting of hydrogen and carbon monoxide through at least three nozzles located within the first 20 feet of the length of the regenerator above the top of the dense phase bed of catalyst particles being regenerated, at a point wherein the overall density is about 4 pounds per cubic foot, to reduce the oxygen content to below about 1.5 volume percent and removing the regenerated catalyst particles downwardly from the dense phase bed in the bottom of the regenerator and then passing the catalyst particles to a catalytic cracking reaction zone.

2. A process according to claim 1 wherein the amount of hydrogen or carbon monoxide gas flow through each nozzle is controlled responsive to oxygen content of the effluent flue gases from the regenerator.

3. The process in accordance with claim 1 wherein the nozzles are located zero to seven feet above the top of the dense phase bed of catalyst particles so that the reducing gas is injected within seven feet of the top of the dense phase.

4. The process in accordance with claim 1 wherein the reducing gas is a hydrogen-rich off-gas from a catalytic reforming unit.

* * * * *